United States Patent
Kawasaki et al.

(10) Patent No.: US 10,826,915 B2
(45) Date of Patent: Nov. 3, 2020

(54) RELAY APPARATUS, NETWORK MONITORING SYSTEM, AND PROGRAM

(71) Applicant: MITSUBISHI ELECTRIC CORPORATION, Tokyo (JP)

(72) Inventors: Jin Kawasaki, Tokyo (JP); Hiroyasu Tabata, Tokyo (JP); Teruyoshi Yamaguchi, Tokyo (JP); Nobuhiro Kobayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 352 days.

(21) Appl. No.: 15/576,642

(22) PCT Filed: Jun. 2, 2015

(86) PCT No.: PCT/JP2015/065848
§ 371 (c)(1),
(2) Date: Nov. 22, 2017

(87) PCT Pub. No.: WO2016/194123
PCT Pub. Date: Dec. 8, 2016

(65) Prior Publication Data
US 2018/0183816 A1    Jun. 28, 2018

(51) Int. Cl.
*H04L 29/06* (2006.01)
*H04L 12/66* (2006.01)
*H04L 12/26* (2006.01)

(52) U.S. Cl.
CPC ......... *H04L 63/1408* (2013.01); *H04L 12/66* (2013.01); *H04L 43/0876* (2013.01); *H04L 63/1458* (2013.01); *H04L 2463/141* (2013.01)

(58) Field of Classification Search
CPC . H04L 63/1408; H04L 12/66; H04L 43/0876; H04L 63/1458; H04L 2463/141
See application file for complete search history.

(56) References Cited

U.S. PATENT DOCUMENTS 7,295,552 B1 * 11/2007 Kadambi ............ H04L 12/4645
370/392
8,248,928 B1 * 8/2012 Wang .................... H04L 43/026
370/230
(Continued)

FOREIGN PATENT DOCUMENTS

CN    103152227 A    6/2013
CN    103618689 A    3/2014
(Continued)

OTHER PUBLICATIONS

Extended European Search Report dated Nov. 30, 2018, issued in the corresponding European Patent Application No. 15894158.3.
(Continued)

*Primary Examiner* — Joseph P Hirl
*Assistant Examiner* — Stephen T Gundry
(74) *Attorney, Agent, or Firm* — Birch, Stewart, Kolasch & Birch, LLP

(57) ABSTRACT

In the present invention, unauthorized access from outside a facility to a device disposed inside the facility is detected by effectively using the output from a mirror port of a network switch. A gateway device has: a monitored data acquisition unit for saving in a monitored data storage unit, as monitored data, packet data that is outputted from a mirror port of a switch, the packet data being outputted from a device being monitored; an unauthorized access detection unit for detecting unauthorized access by determining whether the monitored data is abnormal on the basis of a comparison between the monitored data and assessment rules; and an unauthorized access notification unit for notifying a server of a monitoring center, which is connected to an external network via an external communication unit, that unauthorized access has been detected.

7 Claims, 5 Drawing Sheets

(56) References Cited

U.S. PATENT DOCUMENTS

| | | | | |
|---|---|---|---|---|
| 8,848,744 B1* | 9/2014 | Rothstein | ............ | H04L 43/0823 370/503 |
| 9,338,147 B1* | 5/2016 | Rothstein | ............ | H04L 63/0428 |
| 2005/0198519 A1* | 9/2005 | Tamura | ............ | H04L 63/1408 713/188 |
| 2005/0254490 A1* | 11/2005 | Gallatin | ............ | H04L 41/046 370/389 |
| 2006/0268847 A1* | 11/2006 | Halbraich | ............ | H04L 65/104 370/352 |
| 2008/0262990 A1* | 10/2008 | Kapoor | ............ | G06F 9/505 706/20 |
| 2008/0262991 A1* | 10/2008 | Kapoor | ............ | G06F 21/55 706/20 |
| 2008/0267179 A1* | 10/2008 | LaVigne | ............ | H04L 12/66 370/389 |
| 2008/0282339 A1* | 11/2008 | Nakae | ............ | H04L 63/0227 726/13 |
| 2011/0030056 A1* | 2/2011 | Tokunaga | ............ | H04L 63/1458 726/23 |
| 2011/0194435 A1* | 8/2011 | Nakayama | ............ | H04L 63/1408 370/252 |
| 2011/0213869 A1* | 9/2011 | Korsunsky | ............ | G06F 21/55 709/223 |
| 2011/0214157 A1* | 9/2011 | Korsunsky | ............ | H04L 63/20 726/1 |
| 2011/0231510 A1* | 9/2011 | Korsunsky | ............ | G06F 21/55 709/213 |
| 2011/0231564 A1* | 9/2011 | Korsunsky | ............ | G06F 21/55 709/231 |
| 2011/0238855 A1* | 9/2011 | Korsunsky | ............ | G06F 21/55 709/231 |
| 2012/0257529 A1* | 10/2012 | Ehara | ............ | H04L 12/66 370/252 |
| 2012/0257631 A1* | 10/2012 | Nguyen | ............ | H04L 45/18 370/400 |
| 2012/0268256 A1* | 10/2012 | Akiyama | ............ | H04L 63/1408 340/425.1 |
| 2013/0055374 A1* | 2/2013 | Kustarz | ............ | H04L 63/1441 726/13 |
| 2013/0227689 A1* | 8/2013 | Pietrowicz | ............ | G01R 21/00 726/23 |
| 2013/0232251 A1* | 9/2013 | Pauley | ............ | H04L 43/0876 709/224 |
| 2014/0010096 A1* | 1/2014 | Kamble | ............ | H04L 12/4645 370/252 |
| 2014/0115663 A1* | 4/2014 | Fujishima | ............ | H04L 63/1408 726/3 |
| 2014/0269777 A1* | 9/2014 | Rothstein | ............ | H04L 63/0428 370/503 |
| 2015/0058983 A1* | 2/2015 | Zeitlin | ............ | H04L 63/1408 726/23 |
| 2015/0326599 A1* | 11/2015 | Vissamsetty | ............ | H04L 63/02 726/11 |
| 2015/0358351 A1* | 12/2015 | Otsuka | ............ | H04L 12/66 726/23 |
| 2016/0006692 A1* | 1/2016 | Kako | ............ | H04L 63/1408 726/13 |
| 2016/0036837 A1* | 2/2016 | Jain | ............ | H04L 63/1416 726/23 |
| 2016/0087916 A1* | 3/2016 | Janardhanan | ....... | H04L 63/1408 370/390 |
| 2016/0323305 A1* | 11/2016 | Koide | ............ | H04L 63/145 |
| 2017/0322862 A1* | 11/2017 | Terada | ............ | H04L 45/16 |

FOREIGN PATENT DOCUMENTS

| | | |
|---|---|---|
| CN | 104579818 A | 4/2015 |
| JP | 2005-157650 A | 6/2005 |
| JP | 2006-67279 A | 3/2006 |
| JP | 2007-274265 A | 10/2007 |
| JP | 2012-169731 A | 9/2012 |

OTHER PUBLICATIONS

Nishihara, "TMS Visualizes Threats", Professional ni Manabu Enterprise Security, Montly ASCII Dot Technologies, vol. 15, No. 9, Jul. 24, 2010, total No. pp. 5.

Office Action dated Dec. 27, 2019 in corresponding Chinese Application No. 201580080557.3.

* cited by examiner

RELAY APPARATUS, NETWORK MONITORING SYSTEM, AND PROGRAM

TECHNICAL FIELD

The present invention relates to a relay apparatus, a network monitoring system, and a network monitoring program, and more particularly to detection of unauthorized accesses to equipment and devices installed in the same facility as the relay apparatus.

BACKGROUND

Configuring more open control systems has been accompanied by occurrence of unauthorized accesses to the control systems from malicious third parties. For this reason, it has been required in a field of control systems, including building managing systems, that a network should be monitored to detect unauthorized accesses to the devices connected to the network.

Conventionally, network monitoring methods using an intrusion detection system (IDS), or mounting a network managing apparatus specialized for network monitoring have been suggested (for example, Patent Documents 1 and 2). Further, a technique for detecting an unauthorized access from an external network has been suggested, in which a function of analyzing packets to be relayed is incorporated in a home gateway (for example, Patent Document 3).

CITATION LIST

Patent Literature

Patent Document 1: JP 2005-157650 A
Patent Document 2: JP 2007-274265 A
Patent Document 3: JP 2006-067279 A

SUMMARY

Technical Problem

The use of an apparatus for monitoring a network as described in Patent Documents 1 and 2, however, requires a great amount of cost for detecting unauthorized accesses. In addition, there is a necessity to obtain space for placing the apparatus. Further, in Patent Document 3, it is possible to detect unauthorized accesses to a user terminal from an external network, but it is impossible to detect any unauthorized accesses to the user terminal from an internal network.

Meanwhile, there have conventionally been used network switches (hereinafter, simply referred to as "switch") as a communication apparatus provided with a function of exchanging (switching) communication channels or packets. Some high performance switches are of a type equipped with a mirror port for copying and outputting the entire traffic data passed through regular ports.

An object of the present invention is to effectively utilize outputs from a mirror port of a network switch for detecting an unauthorized access from inside or outside a facility to a device installed in the facility.

Solution to Problem

In one aspect, the present invention provides a relay apparatus which relays data communicated between a server connected to an external network established outside a facility and a device connected directly or indirectly to an internal network established inside the facility. The relay apparatus includes a data acquiring means for acquiring data which is output from a mirror port of a network switch connected to the internal network, a detecting means for analyzing the data acquired by the data acquiring means, to thereby detect an unauthorized access to the device, and a detection information transmitting means for transmitting to the server, when the unauthorized access is detected, detection information on the detected unauthorized access.

The relay apparatus further includes a load status monitoring means for monitoring a status of a load applied on the relay apparatus, and a data storing means for storing the data acquired by the data acquiring means, in which the detecting means analyzes the data only when the load applied on the relay apparatus is smaller than or equal to a predetermined load.

In addition, the relay apparatus further includes a matching processing means for performing a matching process to match the data acquired by the data acquiring means against predetermined filter information, to thereby detect an unauthorized access to the device. In the relay apparatus, the detecting means analyzes the data with respect to which no unauthorized access is detected in the matching process.

Further, the detecting means analyzes data which are transmitted from the device and output from a regular port of the network switch, to detect an unauthorized access to the device.

Moreover, the relay apparatus further includes a load status monitoring means for monitoring a status of a load on the relay apparatus,
a data storing means for storing the data acquired by the data acquiring means, and a detection processing requesting means for transmitting the data stored in the data storing means based on the status of the load applied on the relay apparatus, and requesting the server to perform processing to detect an unauthorized access which should be otherwise performed in the detecting means.

In another aspect, the present invention provides a network monitoring system including a server connected to an external network established outside a facility, a device connected directly or indirectly to an internal network established inside the facility, a relay apparatus that relays data communicated between the server and the device, and a network switch that is connected to the internal network to transmit data, which are input from a regular port, from a mirror port to the relay apparatus, in which the relay apparatus includes a data acquiring means for acquiring data output from the mirror port of the network switch, a detecting means for analyzing the data acquired by the data acquiring means to detect an unauthorized access to the device, and a detection information transmitting means for transmitting to the server, when the unauthorized access is detected, detection information on the detected unauthorized access.

In a further aspect, the present invention provides a program for causing a computer installed in a relay apparatus that relays data communicated between a server connected to an external network established outside a facility and a device connected directly or indirectly to an internal network established inside the facility, to function as a data acquiring means for acquiring data, which is output from a mirror port of a network switch connected to the internal network, a detecting means for analyzing the data acquired by the data acquiring means to detect an unauthorized access to the device, and a detection information transmitting means for transmitting to the server, when the unauthorized access is detected, detection information on the detected unauthorized access.

Advantageous Effects of Invention

According to the present invention, outputs from the mirror port of the network switch can be effectively utilized to detect an unauthorized access attempted from inside or outside the facility to the device installed in the facility.

Further, because the processing to detect an unauthorized access is restricted when the relay apparatus is heavily loaded, there can be prevented an increase on the load on the relay apparatus.

Still further, prior to detection of an unauthorized access performed in the detecting means which is relatively slow in processing, detection of an unauthorized access is performed by means of the relatively high speed process of matching against filter information, which can lead to an increased speed of the processing to detect an unauthorized access, and also lead to a reduced processing load on the relay apparatus.

In addition, an unauthorized access from inside the facility to the device can be detected based on data which are transmitted from the device and received through a regular port of the network switch.

Moreover, when the relay apparatus is under the status of a heavy load, the server is requested to perform the processing to detect an unauthorized access, which can prevent an increase in the load on the relay apparatus.

DESCRIPTION OF EMBODIMENTS

Hereinafter, preferred embodiments of the present invention will be described with reference to the figures.

Embodiment 1

Figure 1:
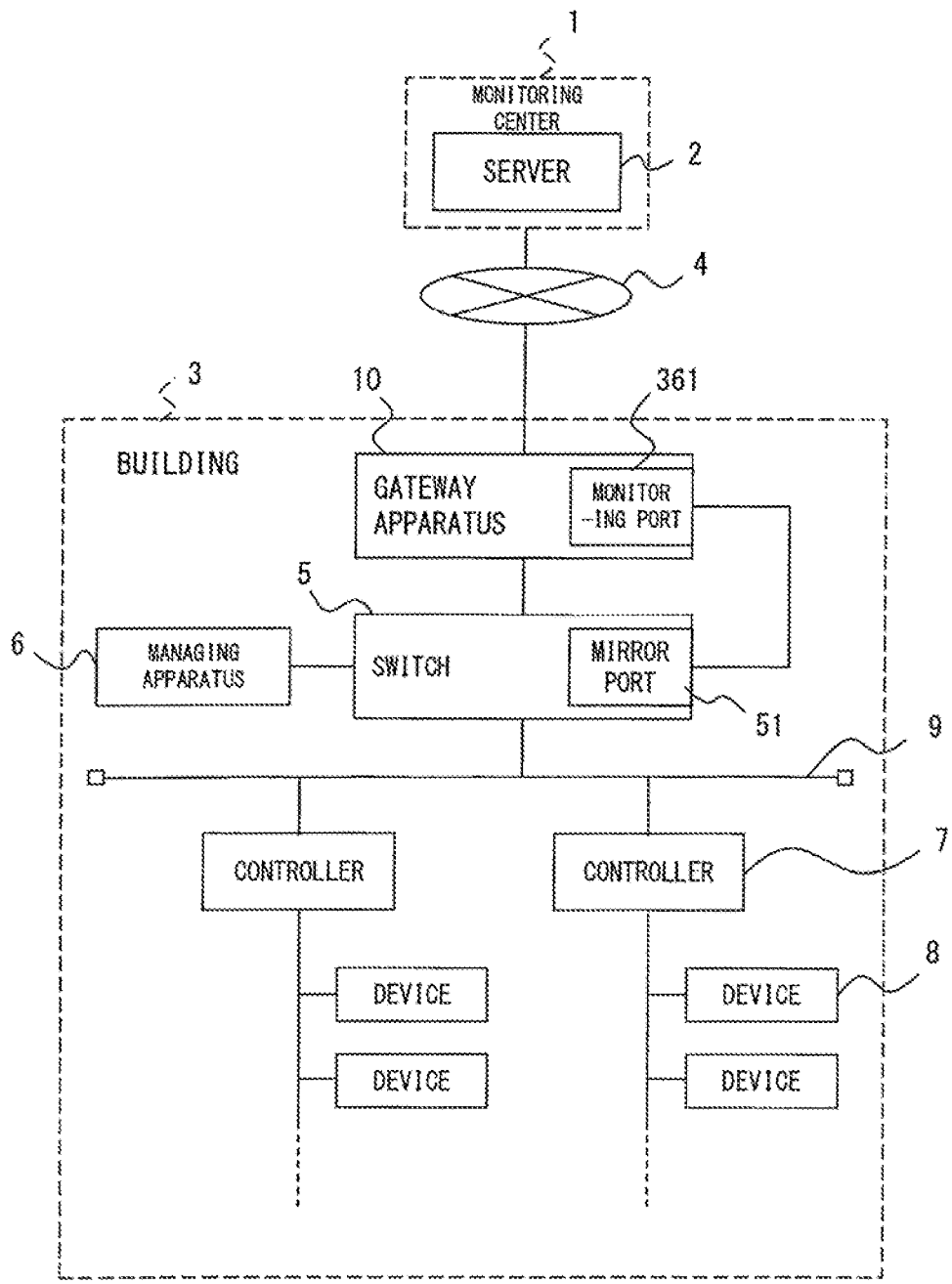
FIG. 1 is a diagram showing an example of a general configuration of a network monitoring system that includes a gateway apparatus according to a first embodiment of this invention.

FIG. 1 is a general configuration diagram showing a network monitoring system in an embodiment according to the present invention. FIG. 1 shows an arrangement in which a server 2 installed in a monitoring center 1 is connected via an external network 4, such as the Internet, to a gateway apparatus 10 installed in a building 3 of a customer. Further, inside the building 3, there are, in addition to the gateway apparatus 10, a switch 5, a managing apparatus 6, controllers 7, and devices 8, such as electric equipment, in which the switch 5 and the controllers 7 are connected to an internal network 9, such as a LAN. Further, the switch 5 is connected to the gateway apparatus 10 and the managing apparatus 6.

The switch 5 is a communication device having a function of exchanging (switching) communication channels and packets. The switch 5 in this embodiment has a mirror port 51 for copying and outputting the entire traffic data passing through a regular port. The mirror port 51 is connected to a monitoring port 361 of the gateway apparatus 10. The regular port of the switch 5 is connected to a regular port of the gateway apparatus 10, and connected to the managing apparatus 6 and the internal network 9. The gateway apparatus 10 relays data exchanged between the server 2 and the devices 8. The managing apparatus 6 monitors and controls various instruments and devices, including the devices 8, connected directly or indirectly to the internal network 9. Each of the controllers 7 controls operation of corresponding one or more of the devices 8 connected to the controller 7, collects data transmitted from the one or more of the devices 8, and performs other processing. The number of controllers 7 installed in the building 3 and the number of devices 8 connected to each of the controllers 7 are predetermined depending on the size of the building 3.

The monitoring center 1 uses the server 2 to transmit control data and other types of data to each of the devices 8 installed in the building 3 for maintenance and management of the devices 8, and acquire data, such as operation track record values, from the devices 8. It should be noted that although the monitoring center 1 monitors the devices 8 installed in one or more buildings 3, because the monitoring is performed in the same way in all of the buildings 3, FIG. 1 shows only one of the buildings 3 for convenience in avoiding repeated explanation.

Figure 2:
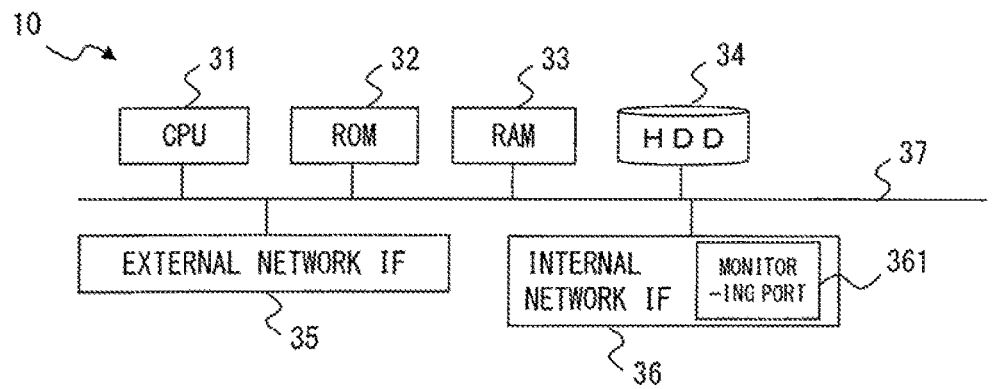
FIG. 2 is a hardware configuration diagram of the gateway apparatus according to the first embodiment.

FIG. 2 is a hardware configuration diagram of the gateway apparatus 10 in this embodiment. The gateway apparatus 10 according to this embodiment is equipped with a computer, and may be implemented using a conventional hardware configuration for general purpose use. More specifically, the gateway apparatus 10 is composed, as shown in FIG. 2, of a CPU 31, a ROM 32, a RAM 33, a hard disc drive (HDD) 34, an external network interface (IF) 35 provided as a communication means and used for connecting the external network 4, and an internal network interface (IF) 36 for connecting the internal network 9, which are all connected to an internal bus 37. The internal network interface 36 includes, in addition to its own regular port (not illustrated) for receiving an output from the regular port of the switch 5, the monitoring port 361 for receiving an output from the mirror port 51 of the switch 5. Note that an interface connectable to the computer may be provided for use in environment setting of the gateway apparatus 10 and other processing, although the interface is not shown in FIG. 2.

Figure 3:
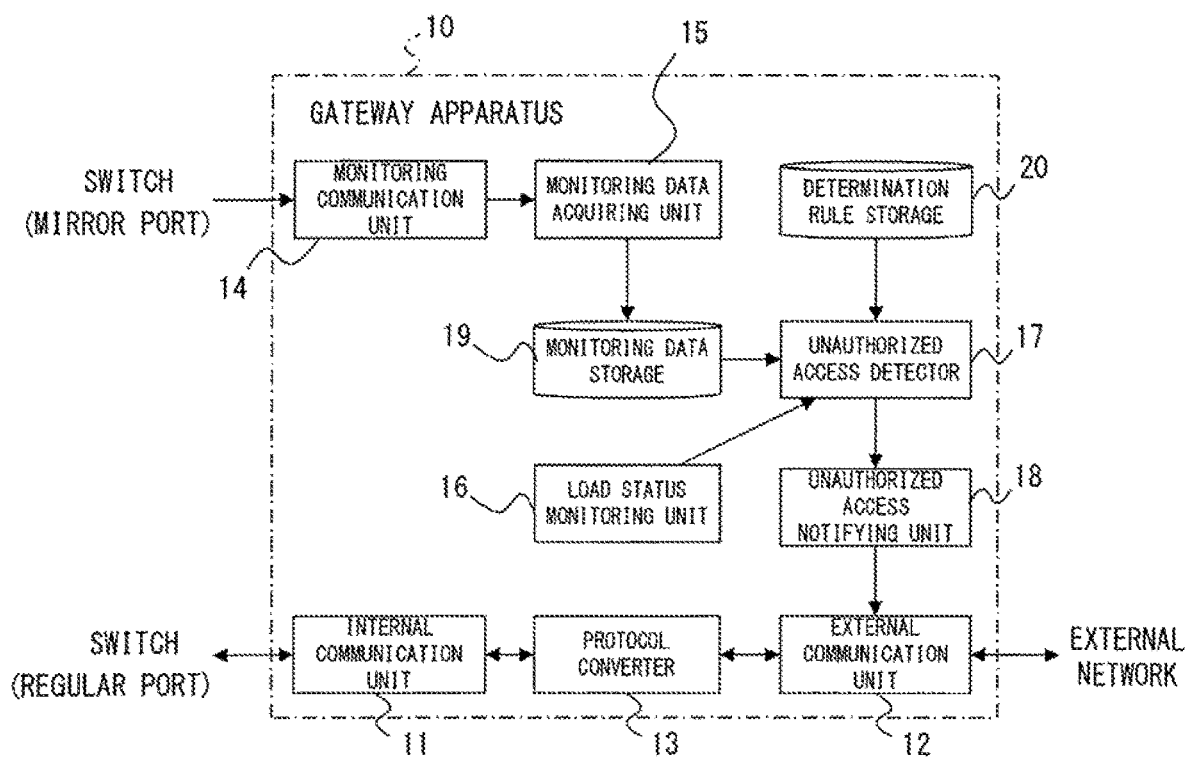
FIG. 3 is a block configuration diagram of the gateway apparatus according to the first embodiment.

FIG. 3 is a block configuration diagram of the gateway apparatus 10 in this embodiment. It should be noted that components which are not explained in connection with this embodiment are not illustrated in the diagram. The gateway apparatus 10 in this embodiment includes an internal communication unit 11, an external communication unit 12, a protocol converter 13, a monitoring communication unit 14, a monitoring data acquiring unit 15, a load status monitoring unit 16, an unauthorized access detector 17, an unauthorized access notifying unit 18, a monitoring data storage 19, and a determination rule storage 20. The internal communication unit 11 provides a function of communicating through the internal network 9 with network devices installed in the building 3, such as the devices 8. The external communication unit 12 provides a function of communicating through the external network 4 with an external device, such as the server 2. The protocol converter 13 provides a function of performing conversion in accordance with a protocol of the server 2 or in accordance with a protocol of the device 8. The monitoring communication unit 14 receives and acquires packet data which is input from the monitoring port 361. The packet data includes items, such as data to be exchanged, a transmission source and a transmission destination of the data, a type of data signal, and the monitoring data acquiring unit 15 analyzes packet data received by the monitoring communication unit 14 to acquire an item used for detecting an unauthorized access from among the items of the received packet data, and stores the acquired item of the packet data as monitoring data in the data storage 19. The load status monitoring unit 16 monitors a status of a load applied on the gateway apparatus 10. The unauthorized access detector 17 is installed as detecting means, and is configured to analyze the monitoring data, which is acquired by the monitoring data acquiring unit 15 and stored in the monitoring data storage 19, to thereby detect an unauthorized access to the device 8. The unauthorized access notifying unit 18 is installed as detection information transmitting means, and is configured to transmit, when an unauthorized access is detected, detection information on the detected unauthorized access to the server 2 through the external communication unit 12.

In the determination rule storage 20, determination rules are previously defined to be represented, depending on a type of data signal transmitted from the device 8, by a threshold value, a range, or other criteria for determining whether or not the transmitted signal data are normal. The threshold value and the range or other criteria for determining normal data have been known from operation track records.

Each of the components 11 to 18 in the gateway apparatus 10 is implemented by cooperative actions of a computer installed in the gateway apparatus 10 and a program running on the CPU 31 contained in the computer. Further, each of the storages 19 and 20 is implemented by the HDD 34 installed in the gateway apparatus 10. Alternatively, the RAM 33 or an external storage means may be utilized via a network for the storage 19 or 20.

In addition, the program used in this embodiment may be, of course, provided through communication means, or may be provided from a computer readable storage medium, such as a CD-ROM or an USB memory, in which the program is stored. The program provided through the communication means or from the storage medium is installed in the computer, and is sequentially executed by the CUP 31 in the computer to perform various type of processing.

In the network monitoring system according to this embodiment, the gateway apparatus 10 implemented by application programs has a particularly characterized function, and the components other than the gateway apparatus 10 in the network monitoring system may be implemented by hardware and functions of each of various conventional devices.

Next, operation of the gateway apparatus 10 according to this embodiment will be described.

In the gateway apparatus 10, when the external communication unit 12 receives data which are transmitted from the server 2 via the external network 4 to the device 8, the protocol convertor 13 converts a format of the received data into a format pursuant to the protocol adopted in the device 8. The internal communication unit 11 transmits the data in the converted format to the device 8. Note that, in addition to the above-described processing performed in normal operation, the switch 5 outputs from the mirror port 51 the data which are transmitted from the gateway apparatus 10. On the other hand, when the internal communication unit 11 receives data which are transmitted from the device 8 via the internal network 9 to the server 2, the protocol converter 13 converts a format of the received data into a format pursuant to the protocol adopted in the server 2. The external communication unit 12 transmits the data in the converted format to the server 2. It should be noted that, in addition to the above-described processing performed in the normal operation, the switch 5 outputs, from the mirror port 51, data which are transmitted from the device 8.

Figure 4:
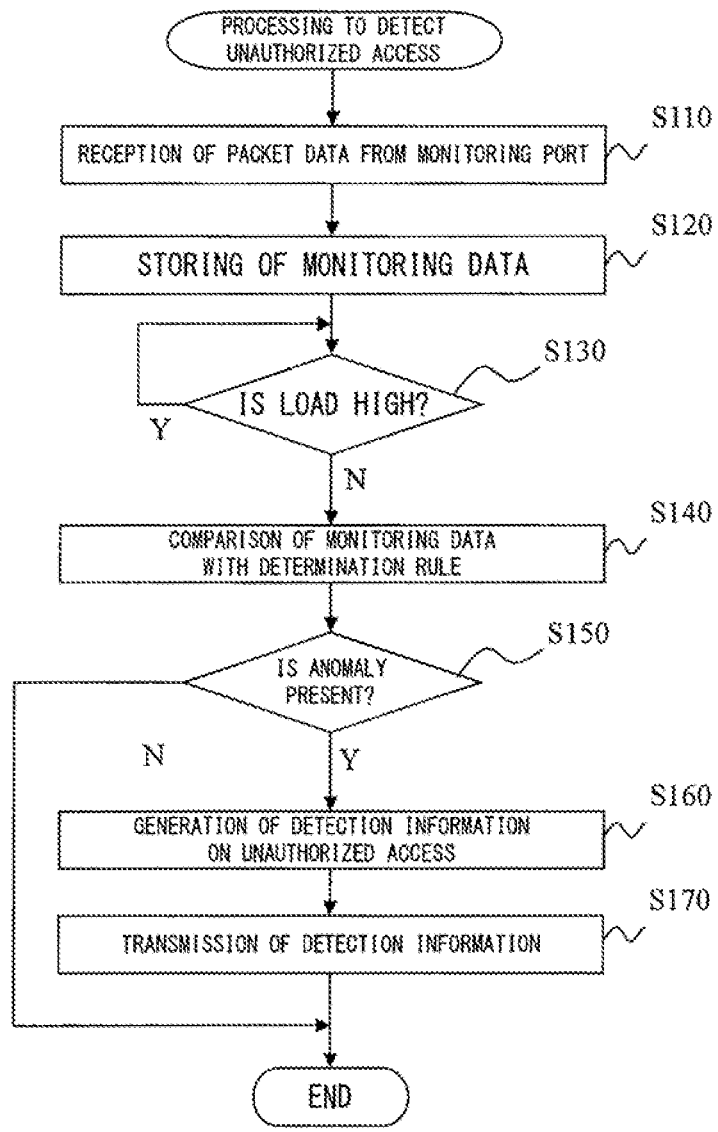
FIG. 4 is a flowchart showing a process to detect an unauthorized access performed by the gateway apparatus according to the first embodiment.

The gateway apparatus 10, which relays, as normal function processing, data exchanged between the server 2 and the device 8 as described above, performs further processing to detect an unauthorized access, which will be described below, in parallel with the normal function processing. Hereinafter, the processing to detect an unauthorized access performed in the gateway apparatus 10 according to this embodiment is described with reference to a flowchart shown in FIG. 4. It should be noted that although the gateway apparatus 10 continuously performs the processing to detect an authorized access with an application program for unauthorized access detection, which is allowed to stay resident in the RAM 33, for convenience of explanation, FIG. 4 shows the processing to be finished when a detected unauthorized access is notified to the server 2. Further note that steps 110 and 120 in the flowchart are independently performed in asynchronism with subsequent steps from step 130, but are depicted in the flowchart as a part of a series of process steps for convenience in illustration.

The switch 5 outputs, from the mirror port 51, data transmitted from an external network 4 side and transmitted from an internal network 9 side, and the monitoring communication unit 14 receives the data output from the mirror port 51 (step 110). Then, the monitoring data acquiring unit 15 extracts a data item used for detecting an unauthorized access in accordance with predetermined rules from those in the received data, and writes and stores the extracted data item in the monitoring data storage 19 as the monitoring data (step 120).

After the application program is initiated, the load status monitoring unit 16 monitors the status of the load on the gateway apparatus 10 at predetermined time intervals. During a period of the monitoring, when the load on the gateway apparatus 10 exceeds a predetermined threshold value (Yes in step 130), it is determined that the load on the gateway apparatus 10 will be increased by causing the unauthorized access detector 17 to perform the processing to detect an unauthorized access, which may interfere with the essential relay function performed by the gateway apparatus 10. Based on the determination, the processing to detect an unauthorized access is disabled in the unauthorized access detector 17.

On the other hand, when the load on the gateway apparatus 10 is smaller than or equal to the predetermined threshold value (No in step 130), the unauthorized access detector 17 checks the presence or absence of an unauthorized access in response to notification from the load status monitoring unit 16. More specifically, the unauthorized access detector 17 performs processing, such as a comparison of the monitoring data stored in the monitoring data storage 19 with the determination rule registered in the determination rule storage 20, to verify whether or not an anomaly is present in the monitoring data (step 140). As a result of the verification, when an anomaly is found to be present (Yes in step 150), the unauthorized access detector 17 determines occurrence of an unauthorized access in light of the found anomaly in the monitoring data, and generates detection information including items, which are considered necessary for analyzing the unauthorized access, such as the data determined to have the anomaly, a transmission source of the data, a transmission destination of the data, and a transmission date and time of the data (step 160). Then, the unauthorized access notifying unit 18 causes the external communication unit 12 to send the generated detection information to the server 2, to thereby notify the server 2 that the unauthorized access is detected (step 170).

According to this embodiment, the anomaly determination based on the monitoring data acquired from the monitoring port 361 is performed only when the load on the gateway apparatus 10 is maintained at or below a fixed load, which can prevent an excessively heavy load applied on the gateway apparatus 10, and therefore prevent an interference with the relay function which should always be performed by the gateway apparatus 10 as the relay apparatus.

Meanwhile, in this embodiment, when operation is performed in accordance with the process steps shown in FIG. 4, step 130 is repeated, unless the load on the gateway apparatus 10 is decreased to the predetermined threshold value or below, without moving to the following steps, resulting in a situation where detection of an unauthorized access is not implemented. With this in view, the operation may be defined to move to step 140 and subsequent steps after the status of the load on the gateway apparatus 10 exceeding a predetermined threshold value continues for a predetermined length of time or longer; i.e., at the occurrence of a timeout, regardless of the load on the gateway apparatus 10 which is not decreased to the predetermined threshold value or lower.

Further, although it is necessary for the network monitoring system according to this embodiment to have the configuration as shown in FIG. 1 in which the gateway apparatus 10 is connected to the external network 4, the switch 5 is connected to the internal network 9, and the monitoring port 361 of the gateway apparatus 10 is connected to the mirror port 51 of the switch 5, the present invention is not limited to the system configuration illustrated in FIG. 1. For example, the managing apparatus 6 may be disposed between the gateway apparatus 10 and the switch 5. This is similarly applied to each of below-described embodiments.

Embodiment 2

Figure 5:
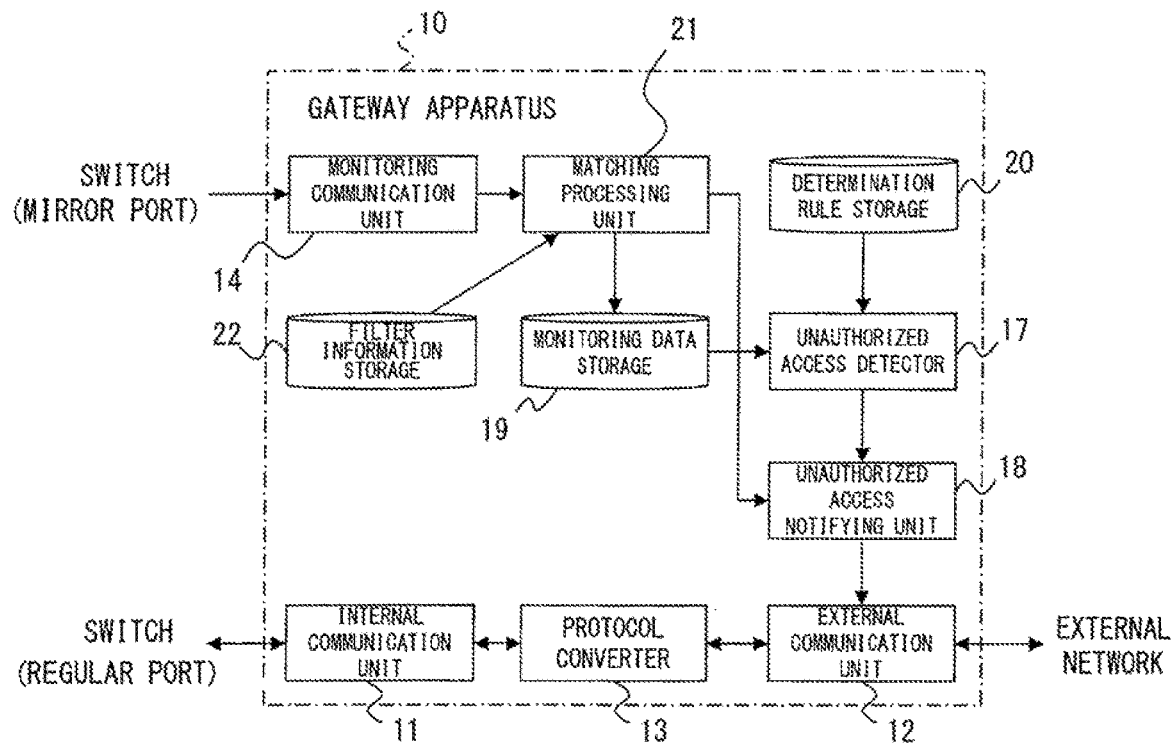
FIG. 5 is a block configuration diagram of the gateway apparatus according to a second embodiment.

FIG. 5 is a block configuration diagram showing the gateway apparatus 10 according to Embodiment 2. It should be noted that the same components as those of Embodiment 1 are designated by the same reference numerals as those of Embodiment 1, and the descriptions related to the components will not be repeated. The gateway apparatus 10 according to this embodiment includes the internal communication unit 11, the external communication unit 12, the protocol converter 13, the monitoring communication unit 14, the unauthorized access detector 17, the unauthorized access notifying unit 18, the monitoring data storage 19, and the determination rule storage 20 as in the case of Embodiment 1, and further includes a matching unit 21 and a filter information storage 22. The filter information storage 22 stores filter information which is previously specified for use in a matching process performed by the matching unit 21. In this embodiment, identification information on a trustworthy device as a communication partner of the device 8 for exchanging data is registered in a white list, and the white list is entered as filter information in the filter information storage 22. The matching unit 21 performs the matching process for verifying a sender of data received by the monitoring communication unit 14 against the white list, to detect an unauthorized access to the device 8.

The matching unit 21 is implemented by cooperative actions of a computer installed in the gateway apparatus 10 and a program running on the CPU 31 contained in the computer. Further, the filter information storage 22 is implemented by the HDD 34 installed in the gateway apparatus 10. Alternatively, the RAM 33 or an external storage may be used as the filter information storage 22 via a network. Meanwhile, the hardware configuration of the gateway apparatus 10 and the remaining other components in the network monitoring system may be the same as those in Embodiment 1.

Next, the processing to detect an unauthorized access according to this embodiment will be described. Note that as the function of normal relay processing is identical to that in Embodiment 1, the description related to the function is not repeated below. This is also applied to the following embodiments.

The processing to detect an unauthorized access in this embodiment is basically the same as that in Embodiment 1. However, this embodiment differs from Embodiment 1 in that the status of the load is not checked, due to lack of the load status monitoring unit 16, and that the processing to detect an unauthorized access includes a process particularly characteristic to this embodiment. More specifically, when the monitoring communication unit 14 receives data, the matching unit 21 identifies a communication partner of the device 8 from the received data, and verifies the communication partner against the white list as a first stage detection of an unauthorized access. Then, when the communication partner is not verified as one of the communication partners registered in the white list, an access associated with the data is determined as an unauthorized access.

However, even though the communication partner of the device 8 is registered in the white list, it cannot be ensured that the communication partner is an authentic trustworthy partner, and that the access is not an unauthorized access. For this reason, even when the communication partner of the device 8 is registered in the white list, the matching unit 21 enters the data as the monitoring data into the monitoring data storage 19. Then, for verification of the entered monitoring data, the unauthorized access detector 17 checks, as second stage detection of an unauthorized access, whether or not any anomaly is present in the monitoring data which is not determined to be an unauthorized access by the matching unit 21. The second stage detection of an unauthorized access performed by the unauthorized access detector 17 may be composed of the same process steps as those in Embodiment 1.

When an unauthorized access is detected in either the matching unit 21 or the unauthorized access detector 17 as described above, the unauthorized access notifying unit 18 causes the external communication unit 12 to send detection information generated in response to the detection of the unauthorized access as in the case of Embodiment 1, to thereby notify the server 2 of the presence of the detected unauthorized access.

According to this embodiment, because the matching unit 21 is provided to perform the relatively high speed matching process using filter information, prior to relatively low speed detection of an unauthorized access performed through comparison and verification against the determination rule in the unauthorized access detector 17, the processing to detect an unauthorized access can be speeded up, while the processing load on the gateway apparatus 10 can be reduced.

It should be noted that although the white list in which device IDs of the trustworthy communication partners are registered is utilized in this embodiment as the filter information used for the matching process, the embodiment is not limited to the matching process using the above-described filter information, and may be implemented using other types of information, such as, for example, a black list in which identification information on unauthorized devices is registered.

Embodiment 3

Figure 6:
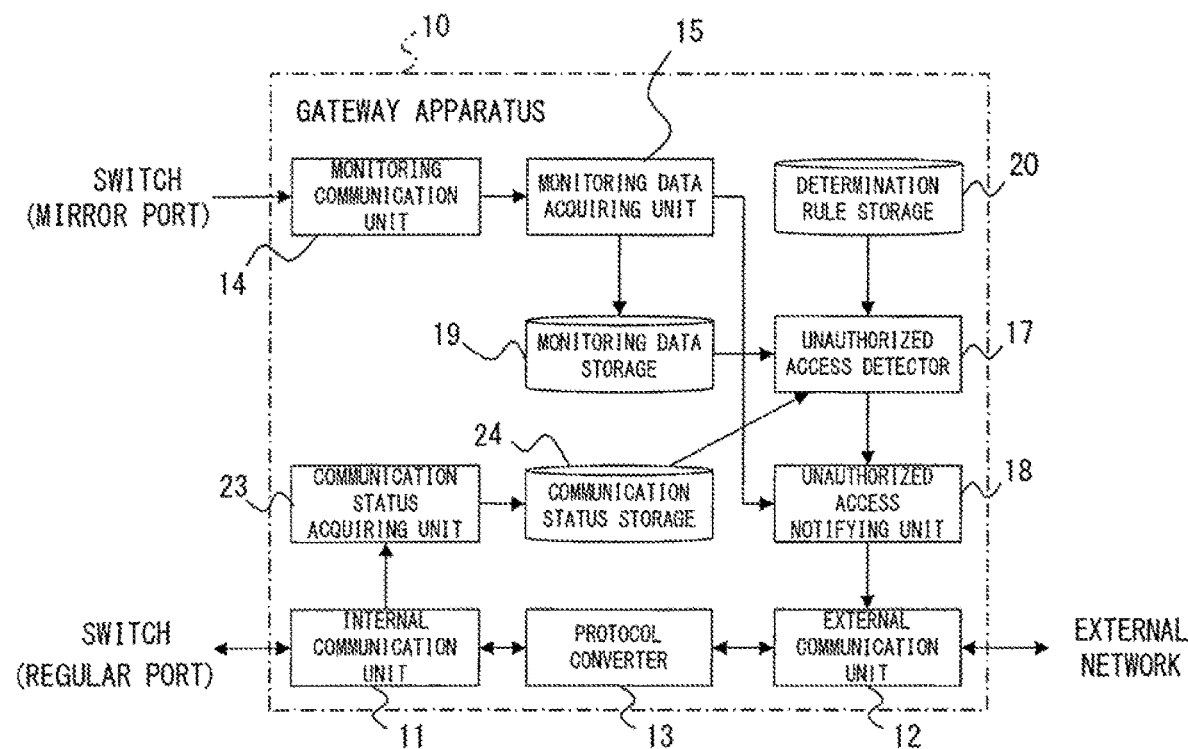
FIG. 6 is a block configuration diagram of the gateway apparatus according to a third embodiment.

FIG. 6 is a block configuration diagram showing the gateway apparatus 10 according to Embodiment 3. Note that the same components as those of Embodiment 1 are designated by the same reference numerals as those of Embodiment 1, and the descriptions related to the components will not be repeated. The gateway apparatus 10 according to this embodiment includes the internal communication unit 11, the external communication unit 12, the protocol converter 13, the monitoring communication unit 14, the monitoring data acquiring unit 15, the unauthorized access detector 17, the unauthorized access notifying unit 19, the monitoring data storage 19, and the determination rule storage 20 as in the case of Embodiment 1, and further includes a communication status acquiring unit 23 and a communication status storage 24. The communication status acquiring unit 23 acquires output data which is output from the regular port of the switch 5 and received by the internal communication unit 11, and stores the acquired data into the communication status storage 24.

The communication status acquiring unit 23 is implemented by cooperative actions of the computer installed in the gateway apparatus 10 and a program running on the CPU 31 contained in the computer. On the other hand, the communication status storage 24 is implemented by the HDD 34 installed in the gateway apparatus 10. Alternatively, the RAM 33 or an external storage may be utilized via a network as the communication status storage 24. The remaining other components contained in the hardware configuration of the gateway apparatus 10 and the remaining other components of the network monitoring system may be identical to those in Embodiment 1.

Meanwhile, there have been known malicious acts of intensively sending packets from one or more devices existing inside or outside the building 3 to one of the devices 8, to thereby exert harmful effects on operation of the one of the devices 8. For example, a distributed denial-of-service (DDoS) attack is one of the malicious acts, and the load of the device 8 will be increased by the DDoS attack, which is regarded as a form of an unauthorized access. In a case where the device 8 is attacked from a third party device installed inside the building 3 without using the external network 4, the gateway apparatus 10 does not relay packets transmitted from the third party device, and therefore is unable to detect the attack.

Given this situation, it is configured that the unauthorized access detector 17 in this embodiment is able to detect an unauthorized access based on regular data input from the regular port by the internal communication unit 11, independently of the detection of an unauthorized access based on data input from the monitoring port 361 by the monitoring communication unit 14 described in the above embodiments.

Specifically, the communication status acquiring unit 23 acquires data which are output from the regular port of the switch 5 and received by the internal communication unit 11, and stores the acquired data in the communication status storage 24. The unauthorized access detector 17 estimates, when the device 8 requires an enormous amount of time to respond to a request, such as a data transmission request, from the server 2 to the device 8, or when a response contains abnormal data, that the reason of the enormous amount of time or the abnormal data is occurrence of an event of receiving an unauthorized access, such as the DDoS attack. Here, whether or not the device 8 has required an enormous amount of time to respond may be determined by comparing an amount of time taken to respond to the request with a predetermined threshold value (a time limit). Meanwhile, whether or not the response contains abnormal data may be determined by comparing values of regular data with a normal range which is previously specified based on a type of the regular data.

According to this embodiment, because the regular data received by the internal communication unit 11 is also checked as an object of analysis, it becomes possible to detect any unauthorized access which cannot be detected from the monitoring data.

It should be noted that although data of the response to the request from the server 2 are analyzed in this embodiment, the gateway apparatus 10 may send to the device 8 an inquiry request demanding a response in order to detect an unauthorized access.

Further, in this embodiment, while the internally delivered DDoS attack has been described as an example, the unauthorized access detector 17 may be configured to similarly address other types of unauthorized access by means of appropriately defined determination rules, such as an appropriate threshold value (upper and lower limits), an appropriate normal range, an allowable degree of change in a value, or an allowable rate of change in a value.

Embodiment 4

Figure 7:
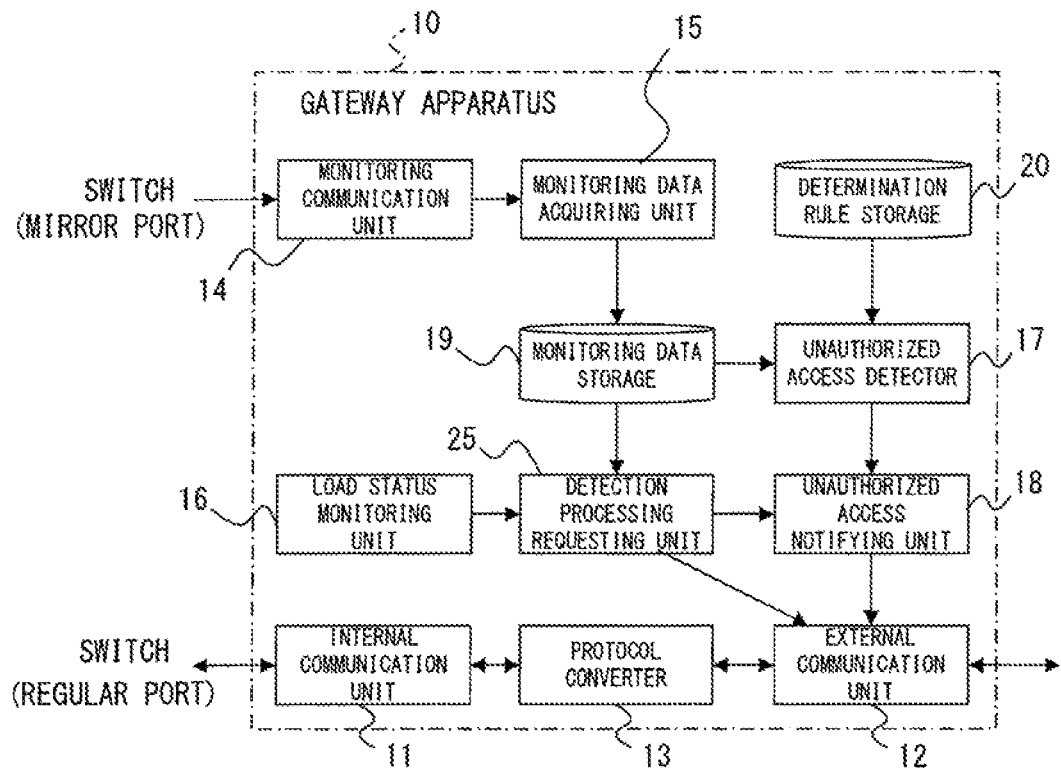
FIG. 7 is a block configuration diagram of the gateway apparatus according to a fourth embodiment.

FIG. 7 is a block configuration diagram showing the gateway apparatus 10 according to Embodiment 4. It should be noted that the same components as those of Embodiment 1 are designated by the same reference numerals as those of Embodiment 1, and the descriptions related to the components will not be repeated. The gateway apparatus 10 according to this embodiment has the same configuration as that described in Embodiment 1 other than a detection processing requesting unit 25 that is added in this embodiment. The detection processing requesting unit 25 transmits the monitoring data stored in the monitoring data storage 19 to the server 2 depending on the status of the load applied on the gateway apparatus 10, to thereby request the server 2 to perform the processing to detect an unauthorized access which should otherwise be performed by the unauthorized access detector 17. The detection processing requesting unit 25 is implemented by cooperative actions of the computer installed in the gateway apparatus 10 and a program running on the CPU 31 contained in the computer.

As described above, the load applied on the gateway apparatus 10 is increased by the unauthorized access detector 17 that performs the processing to detect an unauthorized access, which may raise the possibility of impairing performance of the essential relay function of the gateway apparatus 10.

To eliminate the possibility, the detection processing requesting unit 25 in this embodiment causes, in a case where it is not preferable, in light of an expected greater load on the gateway apparatus 10, that the unauthorized access detector 17 performs the processing, or where the unauthorized access detector 17 is unable to perform the processing, the external communication unit 12 to transmit the monitoring data stored in the monitoring data storage 19 to the server 2, and requests the server 2 to perform the processing to detect an unauthorized access.

Here, the case where it is not preferable that the unauthorized access detector 17 performs the processing corresponds to a situation where the gateway apparatus 10 is under a heavy load due to, for example, its operation to relay data whose traffic is of a very high volume. The processing performed by the unauthorized access detector 17 in the situation where the gateway apparatus 10 is under the heavy load may raise a possibility of impairing performance of the essential relay function of the gateway apparatus 10. On the other hand, the case where the unauthorized access detector 17 is unable to perform the processing corresponds to, for example, a situation where it is necessary that a transition of changes in monitoring data should be analyzed to detect an unauthorized access, but such an analysis cannot be performed due to lack of sufficient storage capacity of the gateway apparatus 10 for retaining a large amount of monitoring data.

When, based on the result of analyzing the status of the load on the gateway apparatus 10 detected in the load status monitoring unit 16 as described above, it is determined that a load exceeding a predetermined threshold value is applied on the gateway apparatus 10, or that the storage capacity of the monitoring data storage 19 is insufficient, the detection processing requesting unit 25 requests the server 2 to perform the processing to detect an unauthorized access.

According to this embodiment, because the server 2 is requested to perform the processing to detect an unauthorized access, there can be prevented the situation that the gateway apparatus 10 is under the heavy load. Further, because the server 2 is higher in performance than the gateway device 10, requesting the server 2 to perform the processing to detect an unauthorized access can lead to detection that is performed with a higher level of functionality.

It should be noted that because the gateway apparatus 10 will be caused to transmit monitoring data to the server 2 under a highly loaded condition, the detection processing requesting unit 25 determines, based on an amount of traffic of the monitoring data, whether to cause the unauthorized access detector 17 to perform the processing to detect an unauthorized access, or to request the server 2 to perform the processing.

Embodiment 5

Figure 8:
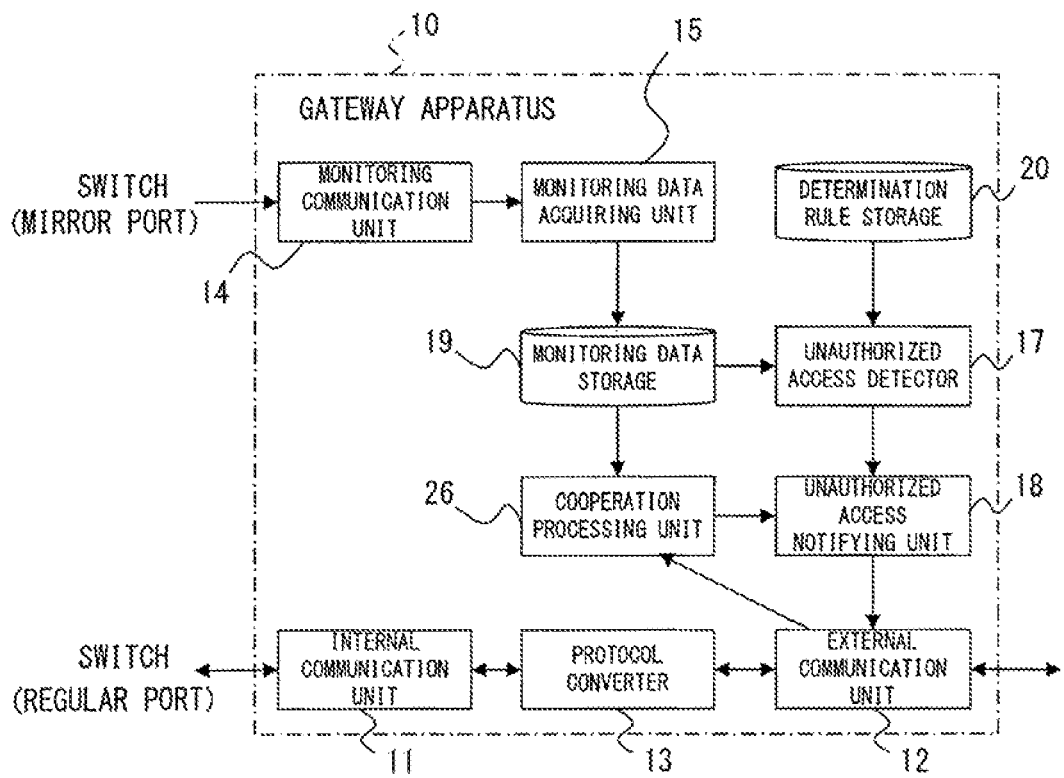
FIG. 8 is a block configuration diagram of the gateway apparatus according to a fifth embodiment.

FIG. 8 is a block configuration diagram showing the gateway apparatus 10 according to Embodiment 5. Note that the same components as those of Embodiment 1 are designated by the same reference numerals as those of Embodiment 1, and the descriptions related to the components will not be repeated. The gateway apparatus 10 according to this embodiment includes the internal transmission unit 11, the external transmission unit 12, the protocol converter 13, the monitoring communication unit 14, the monitoring data acquiring unit 15, the unauthorized access detector 17, the unauthorized access notifying unit 18, the monitoring data storage 19, and the determination rule storage 20 as in the case of Embodiment 1, and further includes a cooperation processing unit 26. The cooperation processing unit 26 provides a function of cooperating with another gateway apparatus 10. The cooperation processing unit 26 is implemented by cooperative actions of the computer installed in the gateway apparatus 10 and a program running on the CPU 31 contained in the computer.

In this embodiment, gateway apparatuses 10 are divided into groups in accordance with conditions of, for example, being installed in one of the neighboring buildings 3 within a predetermined region, being installed in one of the buildings 3 owned by the same manager, etc. Further, in the network management system, a representative one of the gateway apparatuses 10 is previously defined for each of the groups.

To notify the unauthorized accesses detected by the gateway apparatus 10 to the server 2 from the gateway apparatuses 10, in this embodiment the representative one of the gateway apparatuses 10 in each group collectively sends detection information on the unauthorized accesses detected in its own group to the server 2, rather than individually providing the notification to the server 2 from each of the gateway apparatuses 10.

Specifically, when a non-representative one of the gateway apparatuses 10 detects an authorized access, the cooperation processing unit 26 in the non-representative one of the gateway apparatuses 10 transmits detection information to the representative one of the gateway apparatuses 10 in the same group. Further, the cooperation processing unit 26 in the representative one of the gateway apparatuses 10 collectively sends the detection information transmitted from non-representative ones of the gateway apparatuses 10 in the same group. Details of the groups, such as allocation of the gateway apparatuses 10 to each group, and designation of the representative one of the gateway apparatuses 10 may be previously defined in the cooperation processing units 26, or may be registered in not-illustrated storage means.

Regarding the timing of transmission to the server 2, detection information may be immediately transmitted upon its reception, or detection information received within a predetermined time period may be collectively transmitted.

Viewed from a standpoint of the server 2, because detection information is collectively transmitted on a group by group basis, rather than being transmitted respectively from the gateway apparatuses 10, the number of receptions in the server 2 is decreased.

In each of the above-described embodiments, it has been described that the processing to detect an unauthorized access is performed in the gateway apparatus 10 by monitoring the device 8 based on the data output from the mirror port 51 of the switch 5 to detect an anomaly occurring in the device 8; i.e., an unauthorized access to the device 8. In Embodiment 3, the data output from the regular port of the switch 5 is also used as an object of analysis for monitoring the device 8. The configurations and processing details described in the embodiments are not necessarily implemented separately, and may be performed in an appropriately combined manner. In addition, while the gateway apparatus 10 is used as an example of the relay apparatus in description of the embodiment, the relay apparatus is not limited to the gateway apparatus 10, and may be any communication device that has a relay function of connecting the external network 4 and the internal network 9 inside the building 3 to relay data communication between the server 2 and the devices 8.

REFERENCE SIGNS LIST 1 monitoring center, 2 server, 3 building, 4 external network, 5 switch, 6 managing apparatus, 7 controller, 8 device, 9 internal network, 10 gateway apparatus, 11 internal communication unit, 12 external communication unit, 13 protocol converter, 14 monitoring communication unit, 15 monitoring data acquiring unit, 16 load status monitoring unit, 17 unauthorized access detector, 18 unauthorized access notifying unit, 19 monitoring data storage, 20 determination rule storage, 21 matching unit, 22 filter information storage, 23 communication status acquiring unit, 24 communication status storage, 25 detection processing requesting unit, 26 cooperation processing unit, 31 CPU, 32 ROM, 33 RAM, 34 hard disc drive (HDD), 35 external network interface (IF), 36 internal network interface (IF), 37 internal bus, 51 mirror port, 361 monitoring port.

The invention claimed is:

1. A relay apparatus for relaying data communicated between a server connected to an external network established outside a facility and a device connected directly or indirectly to an internal network established inside the facility, the relay apparatus comprising:
    a processor; and
    a memory storing instructions which, when executed, causes the processor to perform a process including,
        acquiring data output from a mirror port of a network switch connected to the internal network,
        analyzing the acquired data by performing matching of the acquired data against predetermined filter information, to detect an unauthorized access to the device,
        transmitting to the server, when the unauthorized access is detected, detection information on the unauthorized access,
    wherein the mirror port of the network switch is configured to copy and output outgoing data from the device to the external network such that said acquired data includes said outgoing data,
    wherein the relay apparatus and the network switch are installed inside the facility, and the relay apparatus is configured as a gateway between the external network and components of the internal network including the network switch and the device, and
    wherein the matching of the acquired data includes matching a transmission destination of the outgoing data to at least one of a white list and a black list.

2. The relay apparatus according to claim 1, the process further comprising:
    monitoring a status of a load applied on the relay apparatus, and
    storing the acquired data, wherein
    the analyzing step performs an analysis on data only when the load on the relay apparatus is lower than or equal to a predetermined load.

3. The relay apparatus according to claim 1, the process further comprising:
    performing matching of the acquired data against predetermined filter information, to thereby detect an unauthorized access, wherein
    the analyzing step performs an analysis on data from which no unauthorized access is detected in the performed matching, to detect an unauthorized access to the device.

4. The relay apparatus according to claim 1, wherein the analyzing step performs an analysis on data which are transmitted from the device and output from a regular port of the network switch, to thereby detect an unauthorized access to the device.

5. The relay apparatus according to claim 1, the process further comprising:
    monitoring a status of a load on the relay apparatus;
    storing data acquired by the acquiring step, and
    transmitting data stored by the storing step to the server based on the status of a load applied on the relay apparatus, and requesting the server to perform the processing to detect an unauthorized access that should otherwise be performed by the relay apparatus.

6. A network monitoring system, comprising:
    a server that is connected to an external network established outside a facility;
    a device that is directly or indirectly connected to an internal network established inside the facility;
    a relay apparatus that relays data communicated between the server and the device, and
    a network switch that is connected to the internal network to transmit data, which is input from a regular port, to the relay apparatus from a mirror port, wherein
    the relay apparatus comprises a processor and a memory storing instructions which, when executed, causes the processor to perform a process including,
        acquiring the data output from the mirror port of the network switch,
        analyzing the acquired data by performing matching of the acquired data against predetermined filter information, to detect an unauthorized access to the device, and
        transmitting to the server, when the unauthorized access is detected, detection information on the detected unauthorized access,
    wherein the mirror port of the network switch is configured to copy and output outgoing data from the device to the external network such that said acquired data includes said outgoing data,
    wherein the relay apparatus and the network switch are installed inside the facility, and the relay apparatus is configured as a gateway between the external network and components of the internal network including the network switch and the device, and
    wherein the matching of the acquired data includes matching a transmission destination of the outgoing data to at least one of a white list and a black list.

7. A non-transitory storage medium that stores a program causing a computer, which is mounted on a relay apparatus for relaying data communicated between a server connected to an external network established outside a facility and a device connected directly or indirectly to an internal network established inside the facility, to:
    acquire data output from a mirror port of a network switch connected to the internal network;
    analyze the acquired data by performing matching of the acquired data against predetermined filter information, to detect an unauthorized access to the device, and
    transmit to the server, when the unauthorized access is detected, detection information on the detected unauthorized access,
    wherein the mirror port of the network switch is configured to copy and output outgoing data from the device to the external network such that said acquired data includes said outgoing data,
    wherein the relay apparatus and the network switch are installed inside the facility, and the relay apparatus is configured as a gateway between the external network and components of the internal network including the network switch and the device, and wherein the matching of the acquired data includes matching a transmission destination of the outgoing data to at least one of a white list and a black list.

* * * * *